United States Patent [19]

Iima

[11] Patent Number: 4,812,026
[45] Date of Patent: Mar. 14, 1989

[54] TELEPHOTO LENS SYSTEM

[75] Inventor: Mitsunori Iima, Tokyo, Japan

[73] Assignee: Asahi Kogaku Kogyo Kabushiki Kaisha, Tokyo, Japan

[21] Appl. No.: 153,683

[22] Filed: Feb. 8, 1988

[30] Foreign Application Priority Data

Feb. 6, 1987 [JP] Japan .................... 62-26787

[51] Int. Cl.$^4$ .................... G02B 13/02; G02B 9/64
[52] U.S. Cl. .................... 350/454
[58] Field of Search .................... 350/454

[56] References Cited

FOREIGN PATENT DOCUMENTS 0251816 11/1986 Japan .................... 350/454

Primary Examiner—John K. Corbin
Assistant Examiner—Rebecca D. Gass
Attorney, Agent, or Firm—Sughrue, Mion, Zinn, Macpeak & Seas

[57] ABSTRACT

A bright and very compact telephoto lens system which is capable of effective aberrational compensation at infinity and with minimal aberrational variations when focused at near distances using inner focusing. The lens system includes a first lens group having a positive refractive power, a second lens group having a positive refractive power and a third lens group having a negative refractive power. The first lens group is composed of a positive first lens element, a positive second lens element, a negative third lens element and a positive fourth lens element. The second lens group includes a cemented positive lens in which a positive fifth lens element is cemented to a negative sixth lens element. The third lens group is composed of a cemented negative lens in which a positive seventh lens element is cemented to a negative eighth lens element, and a positive meniscus ninth lens element having a convex surface directed toward the object side.

6 Claims, 4 Drawing Sheets

TELEPHOTO LENS SYSTEM

BACKGROUND OF THE INVENTION

The present invention relates to a telephoto lens system. More particularly, the present invention relates to a compact telephoto lens system having a high-performance 35 mm for use with a single-reflex lens camera, which lens is lightweight and of small size and which includes a lens group movable for achieving focusing.

Many types of inner focusing telephoto lens systems have been developed. An advantage of such lens systems is that focusing can be carried out with a small force and the user can hold the lens system securely while the lens system has a very small amount of movement in its center of gravity. An example of such a lens system is described in Unexamined Published Japanese patent application No. 214008/1984. Due to these advantages, inner focusing telephoto lens systems have gained growing importance in today's AF (auto focus) oriented camera market.

An important condition to be met by an AF adapted lens system is for the lens group which is moved during focusing to be lightweight and that focusing to be achievable without imposing an undue load on the AF drive unit. It is generally unavoidable for a telephoto lens system to employ optics of a large size, which makes the use of an inner AF design essential.

However, inner focusing lens systems, which require a certain amount of movement of a focusing group to be provided for within optics, inevitably have an increased overall length. If the refractive power of the focusing group is increased to decrease the amount of its movement, great aberrational variations occur when the system is focused for an object at a near distance. For these reasons, it has been difficult to attain a compact inner focusing lens system as compared with other types of telephoto lens system that achieve focusing by advancing either the whole system or the front lens group.

SUMMARY OF THE INVENTION

An object, therefore, of the present invention is to provide telephoto lens system that is very compact (telephoto ratio ≦0.7) and which yet has an F number of about 1:4.5. The telephoto lens system of the present invention is capable of effective aberrational compensation when photographing an object at infinity and experiences very small aberrational variations even when it is focused for an object at a near distance by the inner focusing method.

In accordance with the above and other objects, the invention provides a comprising, in order from the object side, a first lens group having a positive refractive power, a second lens group having a positive refractive power and a third lens group having a negative refractive power. The first lens group is composed of a positive first lens element, a positive second lens element, a negative third lens element and a positive fourth lens element; the second lens group is composed of a cemented positive lens in which a positive fifth lens element is cemented to a negative sixth lens element; the third lens group is composed of a cemented negative lens in which a positive seventh lens element is cemented to a negative eighth lens element, and a positive meniscus ninth lens element having a convex surface directed toward the object side. The lens system of the present invention further satisfies the following conditions:

(1) $0.2 < f_{1,2}/f < 0.4$
(2) $0.4 < f_{1,2,3,4}/f < 0.6$
(3) $25 < \nu_{IP} - \nu_{IN}$
(4) $5.5 < |r_5/r_6| < 7.0$
(5) $-2.2 < \{(n_6-n_5)/r_{10}\} \cdot f < -1.3$ In a preferred embodiment, the telephoto lens system of the present invention achieves focusing for an object at a finite distance by moving either the entire third lens group or the cemented negative lens in the third group, which satisfies the following additional conditions:

(6) $0.12 < r_{14}/f < 0.16$
(7) $0.19 < r_{15}/f < 0.23$
(8) $-0.22 < f_{7,8}/f < -0.15$
(9) $\nu_{7,8} > 80$
$(f/(1/(\nu_{7,8} \cdot f_{7,8}) = 1/(f_7 \cdot \nu_7) + 1/(f_8 \cdot \nu_8))$ The symbols used in conditions (1) to (9) have the following definitions:

- $f$: focal length of the overall system
- $f_{1,2}$: composite focal length from the first to second lens element
- $f_{1,2,3,4}$: composite focal length from the first to fourth lens element
- $\nu_{IP}$: means average of the Abbé numbers of the positive lens elements in the first lens group
- $\nu_{IN}$: means average of the Abbé numbers of the negative lens elements in the first lens group
- $r_i$: radius of curvature of the ith surface counted from the object side
- $n_i$: refractive index at the d line of the ith lens element
- $f_{7,8}$: composite focal length from the seventh to eighth lens elements
- $\nu_{7,8}$: composite Abbé number of the seventh and eighth lens elements
- $f_i$: focal length of the i-th lens element
- $\nu_i$: Abbé number of the i-th lens element.

DESCRIPTION OF THE PREFERRED EMBODIMENTS

Figure 1:
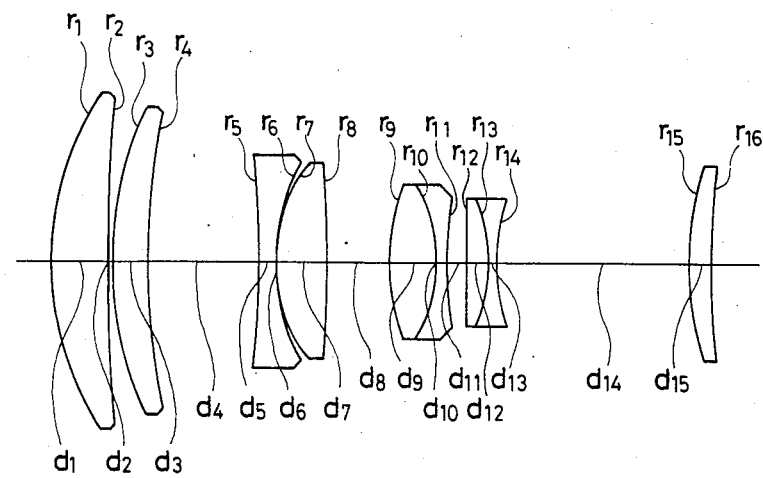
FIG. 1 is a simplified diagrammatic view of a lens system according to an Example 1 described below.
Figure 2:
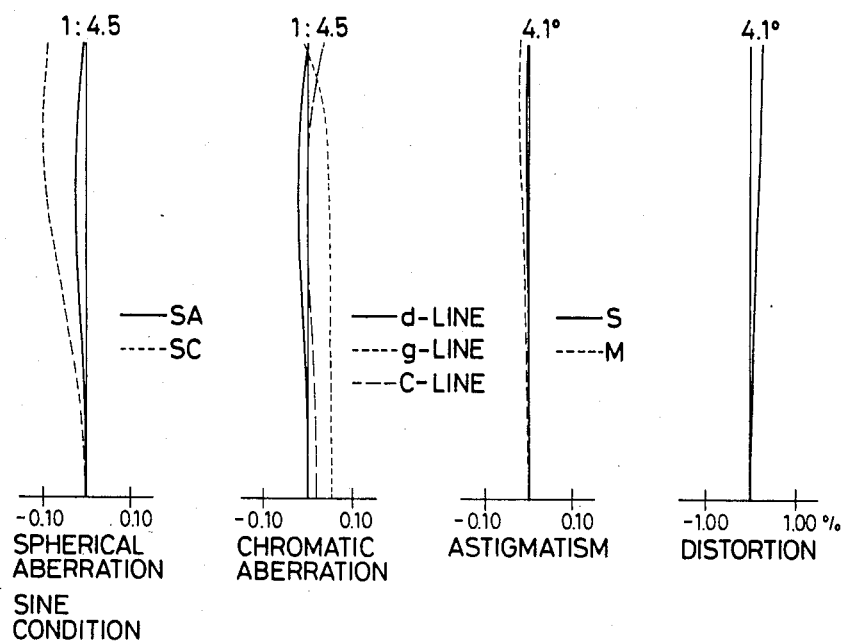
FIG. 2 is a graph showing aberrational curves obtained with the lens system of Example 1 when focused for an object at infinity.

The criticality of each of conditions (1) to (9) is described hereinafter.

Conditions (1) and (2) set forth the requirements that should be met for attaining a compact and high-performance lens system. If the lower limits of these conditions are not reached, the composite power of the first and second lens elements and that of the first to fourth lens elements will be excessive and great difficulty will be involved in compensating for spherical aberration. If the upper limits of conditions (1) and (2) are exceeded, circumstances favorable for aberrational compensation result, but a compact lens system can no longer be attained.

Conditions (3) sets forth the requirement that should be met for compensating chromatic aberration. If this condition is not met, undercompensation of chromatic aberration will result.

Condition (4) sets forth the requirement for the ratio of the radii of curvature of the two surfaces of the third lens element that should be met in order to achieve effective compensation of spherical aberration. If the lower limit of this condition is not reached, undercompensation of spherical aberration will occur, and spherical aberration cannot be effectively overcompensated by other lens surfaces. If the upper limit of condition (4) is exceeded, overcompensation of spherical aberration occurs and spherical aberration cannot be effectively undercompensated by other lens surfaces.

Condition (5) as well as condition (4) set forth the requirement for effective compensation of spherical aberration. If the lower limit of condition (5) is not reached, overcompensation of spherical aberration will occur. If the upper limit of this condition is exceeded, undercompensation of spherical aberration results.

Condition (6) sets forth the requirement for achieving effective compensation for field curvature. If the lower limit of this condition is not reached, overcompensation of field curvature will occur. If the upper limit of condition (6) is exceeded, the result is undercompensation of field curvature.

Condition (7) sets forth the requirement for achieving effective compensation of distortion. If the lower limit of this condition is not reached, increased astigmatism will occur although distortion can be effectively compensated for. If the upper limit of condition (7) is exceeded, undercompensation of distortion results.

Condition (8) sets forth the refractive power that is preferably provided by the cemented negative lens in the third lens group in order to attain a compact lens system and to reduce the aberrational change that occurs when photographing an object at a near distance. If the lower limit of condition (8) is not reached, small aberrational changes will occur when photographing an object at a near distance. However, the focusing lens group has to be moved by a large amount in order to achieve focusing for near distances (i.e., for an object at a finite distance), and this results in an increase in the overall length of the lens system. If the upper limit of condition (8) is exceeded, circumstances favorable for compactness result because the amount of movement of the focusing group necessary to achieve focusing for near distances is decreased. However, the aberrational changes that occur when photographing an object at near distances are increased if the upper limit of condition (8) is exceeded.

Condition (9) sets forth the requirement that is preferably met by the cemented negative lens in the third lens group in order to achieve achromatism. If this condition is not met, the chromatic aberration that has been effectively compensated for by the combination of the first and second lens groups will develop again in the third lens group.

EXAMPLES

Examples 1 and 2 of lens systems constructed according to the present invention are shown in the tables below. In these tables, $F_{NO}$ is the F number, f is the focal length, $\omega$ is the half viewing angle $f_B$ is the back focus, r is the radius of curvature of an individual lens surface, d is the lens thickness or lens-to-lens distance, N is the refractive index at the d line of an individual lens element, and $\nu$ is the Abbé number of an individual lens element.

EXAMPLE 1

| Surface No. | r | d | N | $\nu$ |
|---|---|---|---|---|
| | $F_{NO} = 1:4.5$ | f = 100.00 | | |
| | $\omega = 4.1°$ | $f_B = 20.75$ | | |
| 1 | 19.701 | 4.11 | 1.49700 | 81.6 |
| 2 | 138.854 | 0.39 | | |
| 3 | 23.813 | 2.63 | 1.49700 | 81.6 |
| 4 | 51.454 | 8.06 | | |
| 5 | −77.251 | 1.09 | 1.83400 | 37.2 |
| 6 | 12.833 | 0.18 | | |
| 7 | 11.341 | 3.62 | 1.49700 | 81.6 |
| 8 | −82.282 | 4.46 | | |
| 9 | 14.271 | 3.17 | 1.62004 | 36.3 |
| 10 | −10.191 | 0.86 | 1.78590 | 44.2 |
| 11 | 35.286 | 1.38 | | |
| 12 | −236.315 | 1.55 | 1.83400 | 37.2 |
| 13 | −10.636 | 0.69 | 1.77250 | 49.6 |
| 14 | 13.382 | 13.79 | | |
| 15 | 21.701 | 1.55 | 1.56444 | 43.8 |
| 16 | 58.770 | | | |

Figure 3:
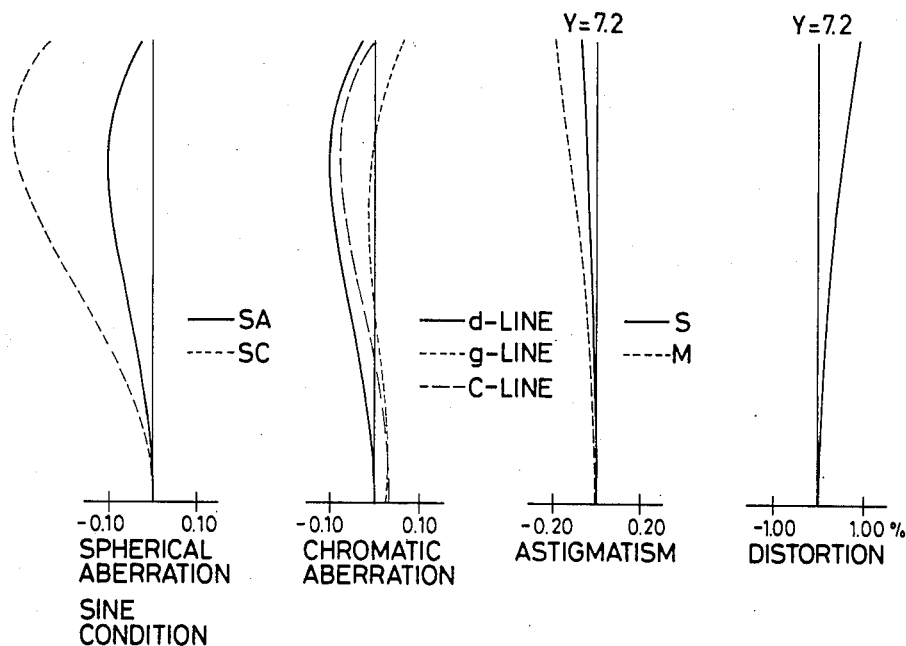
FIG. 3 is a graph showing aberrational curves obtained with the lens system of Example 1 when rear focused by moving the entire third lens group.

The values of $d_{11}$ and $f_B$ in the case where rear focusing is effected by moving the entire third lens group at an image magnification of 1/6 (see FIG. 3 for aberrational curves) are 5.37 and 16.77, respectively.

Figure 4:
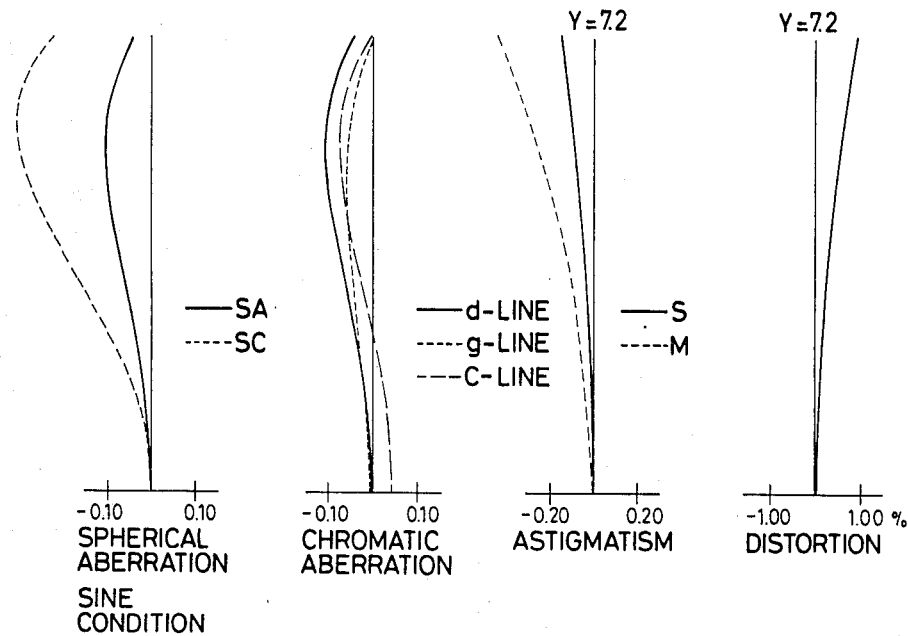
FIG. 4 is a graph showing aberrational curves obtained with the lens system of Example 1 when inner focused by moving the cemented negative lens in the third lens group.
Figure 5:
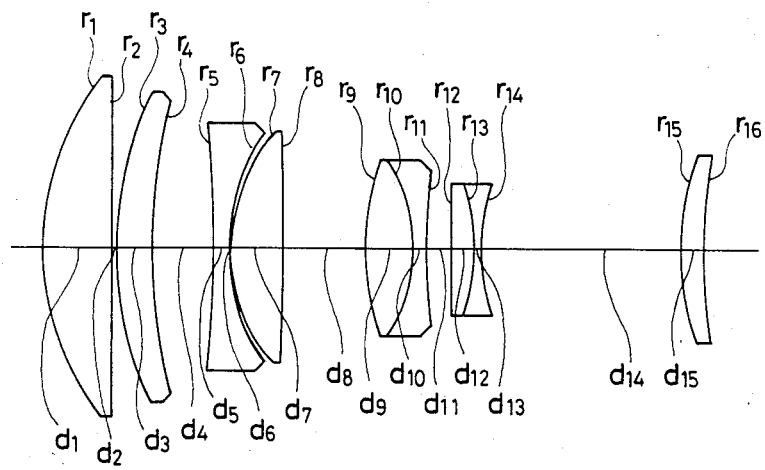
FIG. 5 is a simplified diagrammatic view of a lens system according to an Example 2.
Figure 6:
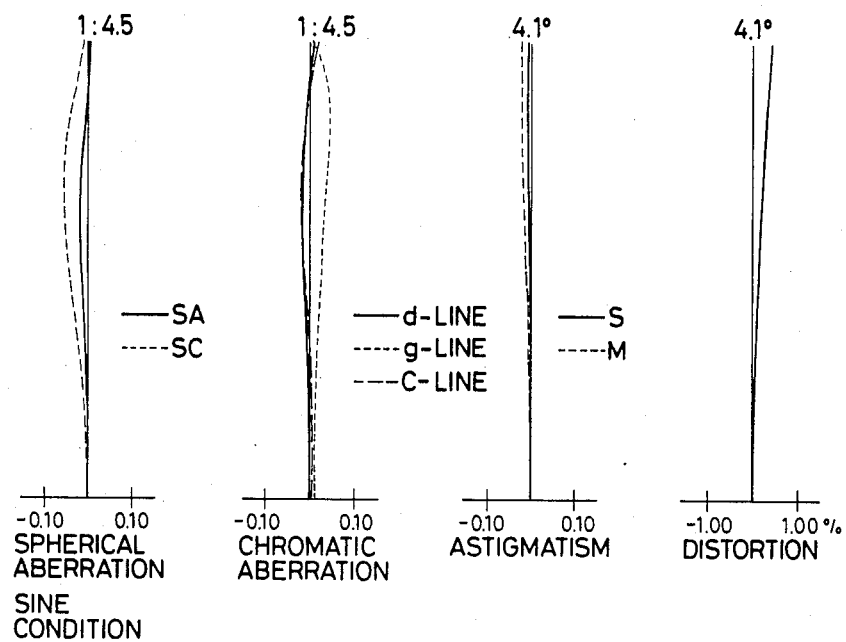
FIG. 6 is a graph showing aberrational curves obtained with the lens system of Example 2 when focused for an object at infinity.

The values of $d_{11}$, $d_{14}$ and $f_B$ in the case where inner focusing is effected by moving the cemented negative lens in the third lens group at air image magnification of 1/6 (see FIG. 4 for aberrational curves) are 4.89, 10.28 and 20.75, respectively.

$f_{1,2}/f=0.304$
$f_{1,2,3,4}/f=0.559$
$\nu_{IP}-\nu_{IN}=44.4$
$|r_5/r_6|=6.020$
$\{(n_6-n_5)/r_{10}\}\cdot f=-1.628$
$r_{14}/f=0.134$
$r_{15}/f=0.217$
$\nu_{7,8}/f=-0.180$
$\nu_{7,8}=87$

EXAMPLE 2

| Surface No. | r | d | N | $\nu$ |
|---|---|---|---|---|
| | $F_{NO} = 1:4.5$ | f = 100.00 | | |
| | $\omega = 4.1°$ | $f_B = 20.34$ | | |
| 1 | 18.539 | 5.01 | 1.49700 | 81.6 |
| 2 | 666.381 | 0.34 | | |
| 3 | 22.968 | 2.73 | 1.49700 | 81.6 |
| 4 | 43.289 | 4.40 | | |

-continued

| | $F_{NO} = 1{:}4.5 \quad f = 100.00$ | | | |
| | $\omega = 4.1° \quad f_B = 20.34$ | | | |
| Surface No. | r | d | N | ν |
|---|---|---|---|---|
| 5 | −90.062 | 1.02 | 1.79952 | 42.2 |
| 6 | 13.290 | 0.22 | | |
| 7 | 11.858 | 3.69 | 1.49700 | 81.6 |
| 8 | −259.715 | 5.95 | | |
| 9 | 17.351 | 3.44 | 1.58144 | 40.7 |
| 10 | −10.097 | 0.96 | 1.77250 | 49.6 |
| 11 | 52.531 | 1.76 | | |
| 12 | −5892.525 | 1.53 | 1.83400 | 37.2 |
| 13 | −12.608 | 0.66 | 1.77250 | 49.6 |
| 14 | 14.221 | 14.37 | | |
| 15 | 20.986 | 1.56 | 1.56138 | 45.2 |
| 16 | 40.693 | | | |

Figure 7:
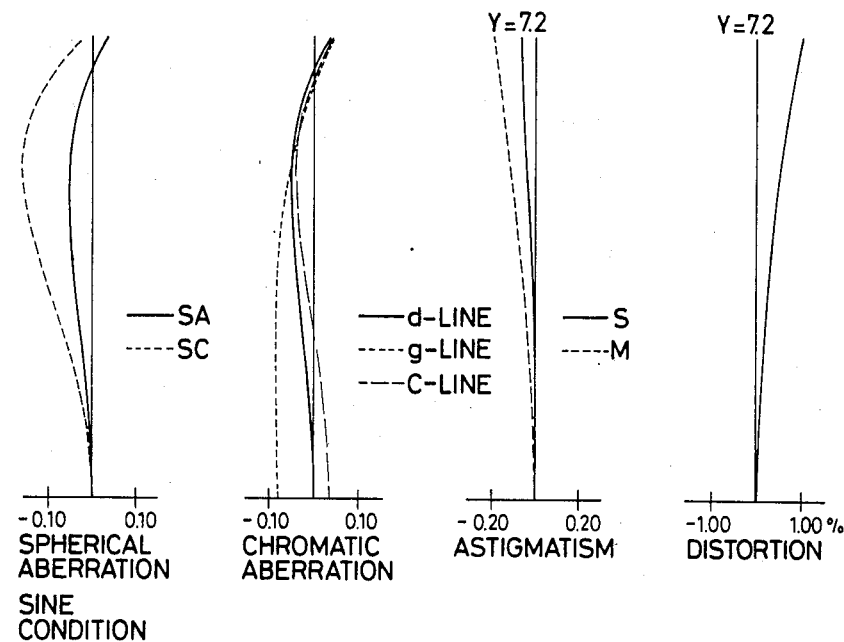
FIG. 7 is a graph showing aberrational curves obtained with the lens system of Example 2 when rear focused by moving the entire third lens group.

The values of $d_{11}$ and $f_B$ in the case where rear focusing is effected by moving the entire third lens group at an image magnification of 1/6 (see FIG. 7 of aberrational curves) are 6.05 and 16.05, respectively.

Figure 8:
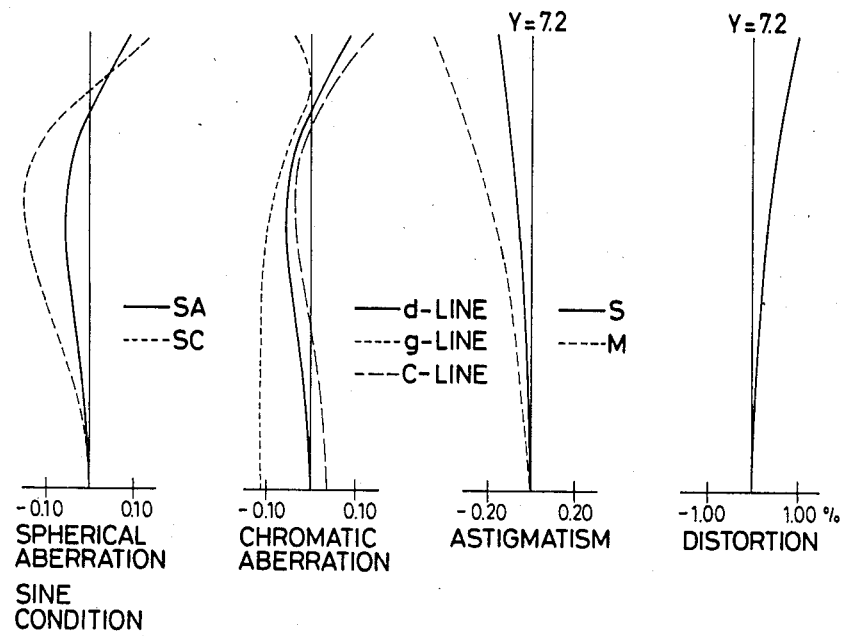
FIG. 8 is a graph showing aberrational curves obtained with the lens system of Example 2 when inner focused by moving the cemented negative lens in the third lens group.

The values of $d_{11}$, $d_{14}$ and $f_B$ in the case where inner focusing is effected by moving the cemented negative lens in the third lens group at an image magnification of 1/6 (see FIG. 8 for aberrational curves) are 5.59, 10.54 and 20.34, respectively.

$f_{1,2}/f = 0.280$
$f_{1,2,3,4}/f = 0.502$
$\nu_{IP} − \nu_{IN} = 39.4$
$|r_5/r_6| = 6.777$
$\{(n_6-n_5)/r_{10}\} \cdot f = -1.892$
$r_{14}/f = 0.142$
$r_{15}/f = 0.210$
$\nu_{7,8}/f = -0.202$
$\nu_{7,8} = 85$ According to the present invention, by satisfying conditions (1) to (5), preferably in combination with conditions (6) to (9), a compact telephoto lens system composed of a positive, a positive and a negative lens group is produced that is capable of effective compensation for aberrations and which is suitable for use as an AF adapted lens system.

I claim:

1. In a telephoto lens system which comprises, in order from the object side, a first lens group having a positive refractive power, a second lens group having a positive refractive power and a third lens group having a negative refractive power the improvement wherein said first lens group comprises a positive first lens element, a positive second lens element, a negative third lens element and a positive fourth lens element; the second lens group is composed of a cemented positive lens comprising a positive fifth lens element cemented to a negative sixth lens element; and the third lens group a cemented negative lens comprising a positive seventh lens element cemented to a negative eighth lens element, and a positive meniscus ninth lens element having a convex surface directed toward the object side, said lens system further satisfying the following conditions:

(1) $0.2 < f_{1,2}/f < 0.4$
(2) $0.4 < f_{1,2,3,4}/f < 0.6$
(3) $25 < \nu_{IP} − \nu_{IN}$
(4) $5.5 < |r_5/r_6| < 7.0$
(5) $-2.2 < \{(n_6/n_5)/r_{10}\} \cdot f < -1.3$ wherein
f: focal length of the overall system
$f_{1,2}$: composite focal length from the first to second lens element
$f_{1,2,3,4}$: composite focal length from the first to fourth lens element
$\nu_{IP}$: means average of the Abbé numbers of the positive lens elements in the first lens group
$\nu_{IN}$: mean average of the Abbé numbers of the negative lens elements in the first lens group
$r_i$: radius of curvature of the ith surface counted from the object side; and
$n_i$: refractive index at the d line of the ith lens element.

2. The telephoto lens system according to claim 1, wherein focusing for an object at a finite distance is achieved by moving at least the cemented negative lens in said third lens group, which satisfies the following additional conditions:

(6) $0.12 < r_{14}/f < 0.16$
(7) $0.19 < r_{15}/f < 0.23$
(8) $-0.22 < f_{7,8}/f < -0.15$
(9) $\nu_{7,8} > 80$
$(f/(1/(\nu_{7,8} \cdot f_{7,8}) = 1/(f_7 \cdot \nu_7) + 1/(f_8 \cdot \nu_8))$ wherein
$f_{7,8}$: composite focal length from the seventh to eighth lens elements
$\nu_{7,8}$: composite Abbé number of the seventh and eighth lens elements
$f_i$: focal length of the i-th lens element; and
$\nu_i$: Abbé number of the i-th lens element.

3. The telephoto lens system according to claim 2, wherein focusing for an object at a finite distance is achieved by moving the cemented negative lens in said third lens group without moving the remainder of said third lens group.

4. The telephoto lens system according to claim 2, wherein focusing for an object at a finite distance is achieved by moving the entire third lens group.

5. A telephoto lens system according to claim 1, further satisfying the following conditions:

| | $F_{NO} = 1{:}4.5 \quad f = 100.00$ | | | |
| | $\omega = 4.1° \quad f_B = 20.75$ | | | |
| Surface No. | r | d | N | ν |
|---|---|---|---|---|
| 1 | 19.701 | 4.11 | 1.49700 | 81.6 |
| 2 | 138.854 | 0.39 | | |
| 3 | 23.813 | 2.63 | 1.49700 | 81.6 |
| 4 | 51.454 | 8.06 | | |
| 5 | −77.251 | 1.09 | 1.83400 | 37.2 |
| 6 | 12.833 | 0.18 | | |
| 7 | 11.341 | 3.62 | 1.49700 | 81.6 |
| 8 | −82.282 | 4.46 | | |
| 9 | 14.271 | 3.17 | 1.62004 | 36.3 |
| 10 | −10.191 | 0.86 | 1.78590 | 44.2 |
| 11 | 35.286 | 1.38 | | |
| 12 | −236.315 | 1.55 | 1.83400 | 37.2 |
| 13 | −10.636 | 0.69 | 1.77250 | 49.6 |
| 14 | 13.382 | 13.79 | | |
| 15 | 21.701 | 1.55 | 1.56444 | 43.8 |
| 16 | 58.770 | | | |

6. The telephoto lens system according to claim 1, further satisfying the following conditions:

| | $F_{NO} = 1{:}4.5 \quad f = 100.00$ | | | |
| | $\omega = 4.1° \quad f_B = 20.34$ | | | |
| Surface No. | r | d | N | ν |
|---|---|---|---|---|
| 1 | 18.539 | 5.01 | 1.49700 | 81.6 |
| 2 | 666.381 | 0.34 | | |
| 3 | 22.968 | 2.73 | 1.49700 | 81.6 |
| 4 | 43.289 | 4.40 | | |
| 5 | −90.062 | 1.02 | 1.79952 | 42.2 |

-continued $F_{NO} = 1:4.5 \quad f = 100.00$
$\omega = 4.1° \quad f_B = 20.34$

| Surface No. | r | d | N | ν |
|---|---|---|---|---|
| 6 | 13.290 | 0.22 | | |
| 7 | 11.858 | 3.69 | 1.49700 | 81.6 |
| 8 | −259.715 | 5.95 | | |

-continued $F_{NO} = 1:4.5 \quad f = 100.00$
$\omega = 4.1° \quad f_B = 20.34$

| Surface No. | r | d | N | ν |
|---|---|---|---|---|
| 9 | 17.351 | 3.44 | 1.58144 | 40.7 |
| 10 | −10.097 | 0.96 | 1.77250 | 49.6 |
| 11 | 52.531 | 1.76 | | |
| 12 | −5892.525 | 1.53 | 1.83400 | 37.2 |
| 13 | −12.608 | 0.66 | 1.77250 | 49.6 |
| 14 | 14.221 | 14.37 | | |
| 15 | 20.986 | 1.56 | 1.56138 | 45.2 |
| 16 | 40.693 | | | |

* * * * *